(12) United States Patent
Inui et al.

(10) Patent No.: US 9,560,329 B2
(45) Date of Patent: Jan. 31, 2017

(54) PROJECTION-TYPE VIDEO DISPLAY DEVICE HAVING ADJUSTING MECHANISM OF TWO OPTICAL ENGINES

(71) Applicant: HITACHI MAXELL, LTD., Osaka (JP)

(72) Inventors: Shinro Inui, Ibaraki (JP); Kazuomi Kaneko, Ibaraki (JP); Nobuki Matsui, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 14/439,515

(22) PCT Filed: Oct. 30, 2012

(86) PCT No.: PCT/JP2012/078002
§ 371 (c)(1),
(2) Date: Apr. 29, 2015

(87) PCT Pub. No.: WO2014/068663
PCT Pub. Date: May 8, 2014

(65) Prior Publication Data
US 2015/0271458 A1    Sep. 24, 2015

(51) Int. Cl.
*G03B 21/14* (2006.01)
*H04N 9/31* (2006.01)
(Continued)

(52) U.S. Cl.
CPC .......... *H04N 9/3188* (2013.01); *G03B 21/142* (2013.01); *G03B 35/20* (2013.01);
(Continued)

(58) Field of Classification Search
CPC ......... G03B 21/00; G03B 21/14; G03B 35/20; G03B 37/04; H04N 9/31; H04N 13/14
See application file for complete search history.

(56) References Cited

U.S. PATENT DOCUMENTS

2009/0141255 A1    6/2009  Yoshizawa
2010/0225885 A1    9/2010  Miyazawa
(Continued)

FOREIGN PATENT DOCUMENTS

CN    2750350 Y    1/2006
JP    07-231460 A    8/1995
(Continued)

*Primary Examiner* — Sultan Chowdhury
*Assistant Examiner* — Danell L Owens
(74) *Attorney, Agent, or Firm* — Volpe and Koenig, P.C.

(57) ABSTRACT

The performance and the functionality of a projection-type video display device are improved to expand an application range of the projection-type video display device. The projection-type display device has two optical engines, increases the luminance of a display image, achieves a pseudo high resolution, or displays a three-dimensional image and a wide screen. The two optical engines have an adjusting mechanism to adjust a position on which an image is displayed. The adjusting mechanism has a plurality of mechanisms which adjust relative three-dimensional axis-direction positions between the two optical engines and inclinations of the optical engines with respect to axes. For example, in consideration of cross actions between adjustments, the plurality of adjusting mechanisms are allocated to the optical engines. As a result, the adjustments can be easily performed.

3 Claims, 7 Drawing Sheets

(51) Int. Cl.
*G03B 35/20* (2006.01)
*G03B 37/04* (2006.01)
*H04N 13/04* (2006.01)

(52) U.S. Cl.
CPC ........... *G03B 37/04* (2013.01); *H04N 9/3147* (2013.01); *H04N 13/0425* (2013.01); *H04N 13/0459* (2013.01)

(56) References Cited

U.S. PATENT DOCUMENTS

| | | |
|---|---|---|
| 2010/0265419 A1 | 10/2010 | Hayashi et al. |
| 2011/0075100 A1 | 3/2011 | Kimura et al. |
| 2011/0292352 A1* | 12/2011 | Yoshizawa ........... H04N 9/3105 353/69 |

FOREIGN PATENT DOCUMENTS

| | | | |
|---|---|---|---|
| JP | 08-168039 A | | 6/1996 |
| JP | 09-265132 A | | 10/1997 |
| JP | 2000-137288 A | | 5/2000 |
| JP | 2000147694 A | * | 5/2000 |
| JP | 2003-241306 A | | 8/2003 |
| JP | 2005-070506 A | | 3/2005 |
| JP | 2009-134069 A | | 6/2009 |
| JP | 2009-192971 A | | 8/2009 |
| JP | 2010-204333 A | | 9/2010 |
| JP | 2010-256394 A | | 11/2010 |
| JP | 2011-075669 A | | 4/2011 |
| JP | 2011-203286 A | | 10/2011 |

* cited by examiner

θ V ADJUSTMENT

FIG. 6B

Z ADJUSTMENT

F I G. 7 A

θ Z ADJUSTMENT

F I G. 7 B

θ H ADJUSTMENT

FIG. 8

PROJECTION-TYPE VIDEO DISPLAY DEVICE HAVING ADJUSTING MECHANISM OF TWO OPTICAL ENGINES

TECHNICAL FIELD

The present invention relates to a projection-type video display device.

BACKGROUND ART

Projection-type video display devices using liquid crystal panels, with increasing opportunities to utilizing the devices in, for example, presentation halls and the like, are required to be simplified and reduced in price and, furthermore, to get high performance and high function.

Patent Literature 1 discloses a technique of compensating for defocus caused by a change in temperature with a simple mechanism.

Patent Literature 2 discloses a technique to use a planar mirror as a projection mirror.

CITATION LIST

Patent Literature

PTL 1: Japanese Patent Application Laid-Open No. 2010-256394
PTL 2: Japanese Patent Application Laid-Open No. 2011-075669

SUMMARY OF INVENTION

Technical Problem

When projection-type video display devices are simplified and reduced in price as described above, it has been a problem that high performance and high function are achieved by using two projection-type video display devices.

Use of the two projection-type video display devices may obtain, for example, a high-luminance display image, may improve reliability not to lose a display function even though one of the display devices is broken, may increase the resolution by slightly moving display images of the two display devices from each other, may display a three-dimensional (3D) image, or may obtain a wide image by horizontally moving display images of the two display device by one screen.

At the same time, an adjusting mechanism and an adjusting method for accurately adjusting positions on which the two projection-type video display devices project images poses an important problem.

It is an object of the present invention to provide a high-performance or high-functional projection-type video display device which improves the accuracy of required adjustment.

Solution to Problems

In order to solve the problem, the present invention provides a projection-type video display device which optically projects an image based on a video signal on an external display unit to display the image thereon and which has two optical engines each optically projecting the image to the outside and an adjusting mechanism to adjust relative positions of the images displayed by the two optical engines.

Advantageous Effects of Invention

According to the present invention, a high-performance or high-functional projection-type video display device which improves the accuracy of required adjustment.

DESCRIPTION OF EMBODIMENTS

An embodiment of the present invention will be described below with reference to the accompanying drawings. An overall configuration of an optical engine in a projection-type video display device will be described first.

Figure 1:
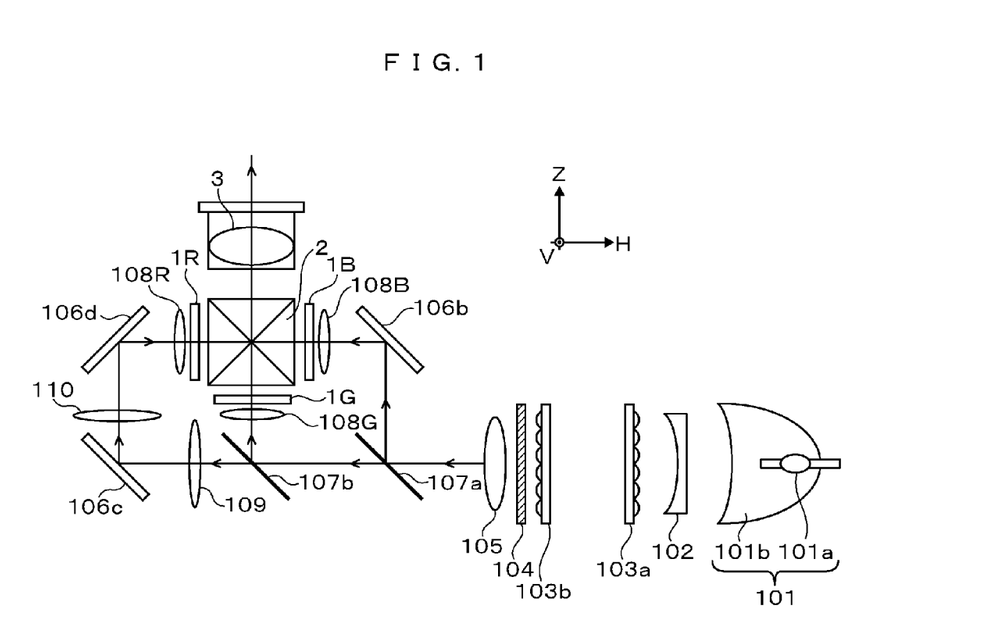
FIG. 1 is a block diagram of an optical engine in a projection-type video display device.

FIG. 1 is a block diagram of an optical engine in a projection-type video display device. Three-dimensional coordinate axes to make the relationship between this drawing and the following drawings clear are shown in an upper right portion of FIG. 1. Reference symbol H indicates a horizontal direction (lateral direction) of a screen to be displayed, reference symbol V indicates a perpendicular direction (vertical direction), and reference symbol Z indicates a depth direction.

In FIG. 1, a light source unit 101 includes a lamp 101a serving as a light-emitting unit and a reflector 101b serving as a reflecting surface. A flux of light emitted from the lamp 101a arranged at a first focal position of the elliptical reflector 101b is reflected by the reflecting surface such that the flux of light is converged on a second focal position of the reflector 101b. The converged flux of light the flux size of which is reduced is converted into a parallel flux of light by a concave lens 102 having a parallelizing function. When the reflector 101b is paraboloidal, the concave lens 102 for parallelization is not necessary.

The parallel flux of light emitted from the concave lens 102 is divided into partial fluxes of light by cell lenses in a first multi-lens array 103a, and the partial fluxes of light are converted on cell lenses of a second multi-lens array 103b corresponding to the first multi-lens. The converted partial fluxes of light are temporarily separated by a linear polarizing unit 104 into two linear polarized lights having oscillation directions orthogonal to each other, and the oscillation direction of one of the linear polarized lights is matched with the oscillation direction of the other linear polarized light to convert the polarized lights into polarized light having one oscillation direction.

The partial fluxes of light emitted from the linear polarizing unit 104 are superposed and irradiated on liquid panel units 1R, 1G, and 1B for RGB colors through a superposing lens 105 to constituent elements (will be described later). On optical paths between the superposing lens 105 and the liquid crystal panel units 1R, 1G, and 1B, reflecting mirrors 106b, 106c, and 106d to bend the optical paths and dichroic mirrors 107a and 107b are arranged. Furthermore, before the liquid panel units 1R, 1G, and 1B, collimator lens 108R, 108G, and 108B to parallelize a principal ray of projected fluxes of light are arranged. On a red optical path having an optical length longer than that of a green or blue optical path, relay lens 109 and 110 to map the superposed fluxes of light on the position of the red liquid crystal panel unit 1R are arranged.

The fluxes of light supplied from the lamp 101a to the liquid crystal panel units 1R, 1G, and 1G, depending on the levels of a video R signal, a video G signal, and a video B signal supplied to the liquid crystal panel units 1R, 1G, and 1B, change amounts which can pass through the liquid crystal panels, respectively. As a result, information of the video signals is given to the flux of light. For this purpose, the liquid crystal panel units 1R, 1G, and 1B have not only liquid crystal panels but also polarizing plates to cause fluxes of light having predetermined oscillation directions to pass through the polarizing plates, respectively.

The fluxes of light passing through the liquid crystal panel units 1R, 1G, and 1B are synthesized with each other by a cross prism 2 to display a video image depending on the video signals on an externally arranged screen (not shown).

The configuration of the optical engine shown in FIG. 1 does not limit the present invention. For example, as shown in FIG. 12 in PTL2, an example further including a reflecting mirror 106a which is not included in the configuration in FIG. 1 to change an arrangement of constituent elements arranged between the light source unit 101 and the superposing lens 105 may be conceived. Although other different examples may be conceived, the optical engine which can be applied to the present invention is not limited to a specific configuration.

Figure 2:
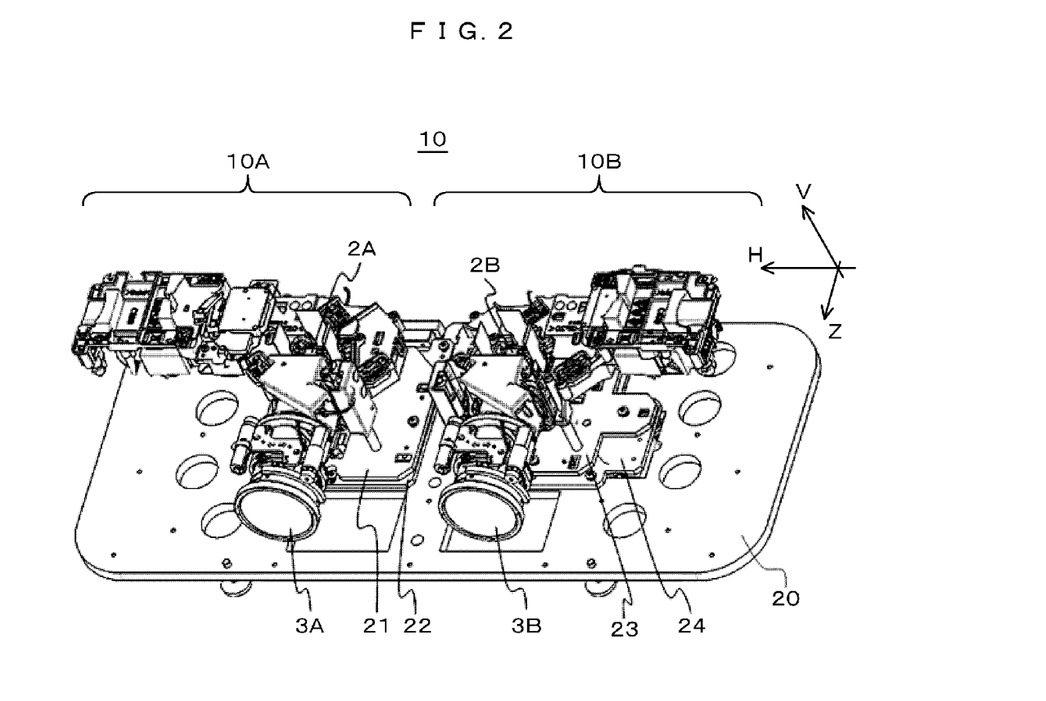
FIG. 2 is an outside view of the optical engine in the projection-type video display device.

FIG. 2 is an outside view of optical engines 10A and 10B in a projection-type video display device 10, and is drawn when obliquely viewed from the above. More specifically, the projection-type video display device 10 according to the embodiment has the two optical engines 10A and 10B. Reference numerals 2A and 2B and 3A and 3B are given to the cross prisms and the projection lenses of the optical engines 10A and 10B, respectively.

The first optical engine 10A is attached to a main base 20 through a first adjusting base 21 and a second adjusting base 22, and the second optical engine 10B is attached to the main base 20 through a third adjusting base 23 and a fourth adjusting base 24. More specifically, since the first optical engine 10A and the second optical engine 10B are adjusted by a user such that a relative positional relationship between images displayed by the optical engines is a predetermined relationship, the first and second optical engines 10A and 10B are attached to the main base 20 through the adjusting bases 21 to 24.

Operations of the adjusting bases 21 to 24 will be described later. The present invention is not limited to a device having a specific adjusting mechanism, and normally includes a device having the mechanism for adjusting a relative positional relationship.

As is apparent from FIG. 2, optical parts included in the optical engines 10A and 10B are arranged such that the optical parts are mirror-inverted with respect to the center of, for example, the dichroic mirror 107b or the cross prism 2 in FIG. 1, or inverted symmetrically about a point. Thus, as the optical parts of the optical engines 10A and 10B, common optical parts can be used. However, the embodiment can also be applied when the arrangements of the optical parts of the two optical engines do not have a mirror-inversion relationship but are the same as each other, when the two optical engines have different block configurations, and when common optical parts are not used.

At the present, a projection-type display device which projects a flux of light having a high luminance of a 5000-lumen class while a compact low-price liquid crystal panel having, for example, a 0.63-inch size is used in the liquid crystal panel unit 1 has been developed. While two optical engines of the device are used, a high-performance or high-functional projection-type display device having a high cost performance may be developed.

First, both the optical engines may project the same images on the same position to plan to achieve a high luminance. In the example, a flux of light of a 10000-lumen class can be projected. When one of the two light sources is broken, the display of the image can be continued by only the other optical engine. Alternatively, only one of the optical engines is always used to use the other in preparation for failure, and the reliability of the device can be improved.

Secondly, pseudo high resolution which apparently increases a resolution of an image to be displayed can be achieved. For example, when an image is constituted by a plurality of blocks each having 6×8 pixels, one optical engine displays the 48 pixels of each of the blocks. The other optical engine displays 48 pixels at positions moved from the pixels by ½ pixels in the horizontal and vertical directions, respectively. In this manner, a pseudo high resolution at which 192 pixels are displayed per block can be achieved.

Thirdly, both the optical engines project images of channels different from each other for a three-dimensional image to make it possible to display a so-called 3D image.

Fourth, when both the optical engines arrange positions on which images are projected such that the positions are horizontally adjacent to each other, a so-called 2-screen wide image can be displayed.

On the other hand, in any usage, an adjusting mechanism to set positions on which the two optical engines project their images to predetermined position is important. For example, in a liquid crystal panel having the size described above, when the pseudo high resolution is to be obtained, an interval corresponding to a ½ pixel is about 5 μm. For this reason, a particularly accurate adjusting mechanism is required.

As a method except for the mechanically adjusting method, a method of performing an arithmetic process to a video signal of an image to be displayed to correct displacements of projection positions may be conceived. However, when the video signal is to be processed as described above, the image quality of an image to be displayed is disadvantageously deteriorated. Thus, in the following embodiment, mechanical adjustment of positions on which two optical engines project their images will be described below.

Both the optical engines projects checkered image patterns on an outside display unit typified by a screen, a user performs the adjustment while observing interference fringes (moire) appearing at an edge of the image. The adjustment is performed such that the centers of the cross prisms 2A and 2B held by the optical engines 10A and 10B have a predetermined positional relationship.

Figure 3:
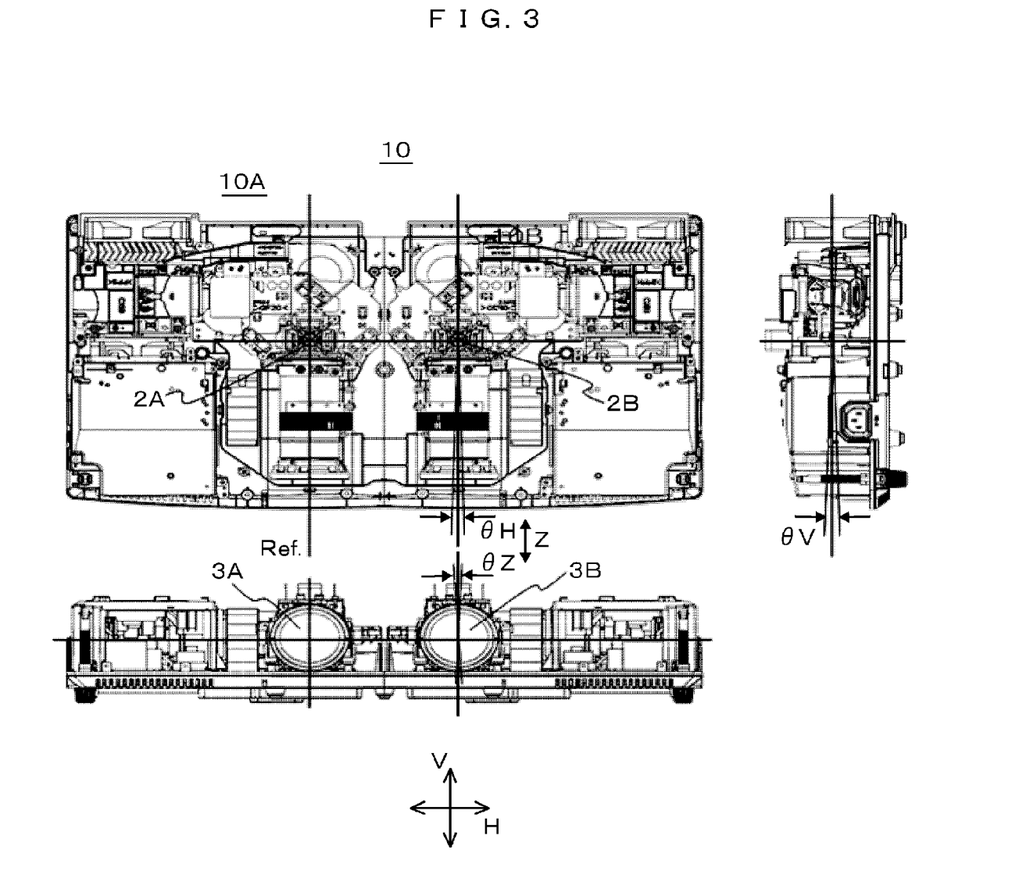
FIG. 3 is a plan view showing a first adjusting method for the projection-type video display device.

FIG. 3 is plan views showing a first adjusting method of the projection-type video display device 10. In FIG. 3, a view obtained when viewed from the positive side to the negative side of a V axis is shown at the center, a view obtained when viewed from the positive side to the negative side of an H axis is shown on the right side, and a view obtained when viewed from the positive side to the negative side of a Z axis is shown on the lower side. The first adjusting method is a method of fixing the position of the first optical engine 10A as a reference and moving only the position of the second optical engine 10B to perform adjustment.

Parameters for adjusting the relative positions of the two optical engines 10A and 10B will be described here.

As indicated by a bidirectional arrow in FIG. 3, the position must be adjusted such that the position is moved in parallel with the H axis, the V axis, and the Z axis. The parameters will be represented by H, V, and Z, in the order named. The positions must be adjusted such that the position is rotationally moved about the V axis in a direction almost parallel to the H axis, rotationally moved about the H axis in a direction almost parallel with the V axis, and rotationally moved about the Z axis in a direction almost parallel with the H axis. The parameters are represented by $\theta H$, $\theta V$, and $\theta Z$ in the order named. Here, the H axis, the V axis, and the Z axis have the center of the cross prism held by the optical engine to be adjusted as their origins.

In the first adjusting method shown in FIG. 3, the optical engine 10A is fixed, and the optical engine 10B is moved in H, V, and Z directions, and the optical engine 10B is rotationally moved about the center of the cross prism 2B in the $\theta H$, $\theta V$, and $\theta Z$ directions, so as to adjust the relative positions of both the optical engines. Since the adjustment is performed by using the center of the cross prism 2B as a rotating center, a cross action in which adjustment of a certain parameter causes the optimum position of another parameter does not occur. Thus, the order of adjustment of the parameters need not be specially considered.

However, in order to adjust the three $\theta H$, $\theta V$, and $\theta Z$ directions by the optical engine 10B serving as one of both the optical engines, the third adjusting base 23 shown in FIG. 2 in advance must have a spherical seat which allow the optical engine to rotate in all directions. The rotating center of the spherical seat is designed to be the center of the cross prism 2B. The spherical seat is difficult to be design, and inevitably moves the optical engine in the direction $\theta V$ or $\theta Z$ when the optical seat moves in the $\theta H$ direction.

In order to solve the problem, adjustment performed by allocating the parameters to the first optical engine 10A and the second optical engine 10B will be considered.

Figure 4:
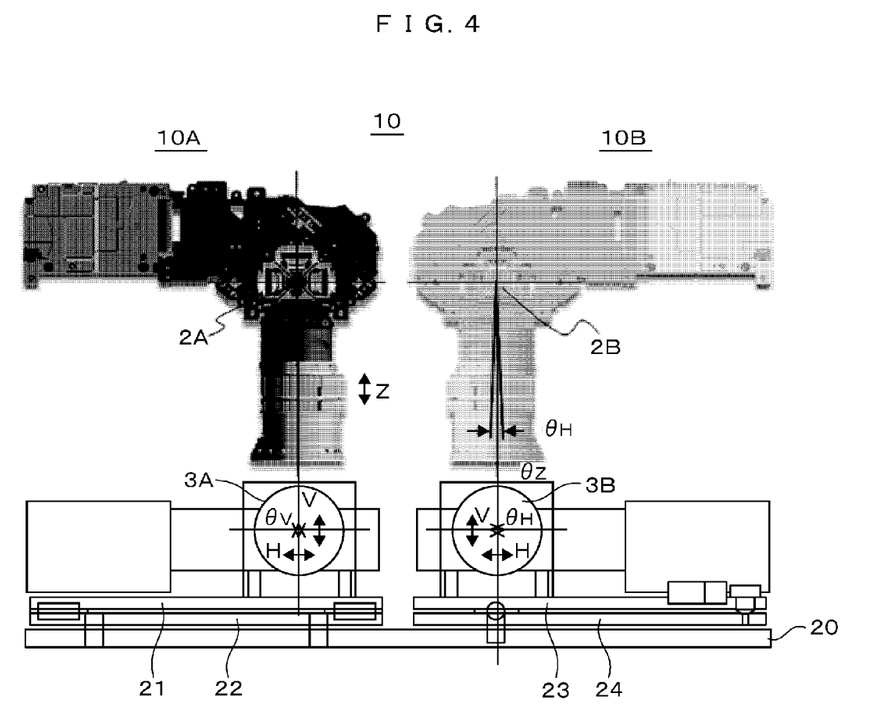
FIG. 4 is a plan view showing a second adjusting method for the projection-type video display device.

FIG. 4 is a plan view showing a second adjusting method of the projection-type video display device 10. Here, an example in which the parameters Z and $\theta V$ are adjusted in the first optical engine 10A and the parameters $\theta H$ and $\theta Z$ are adjusted in the second embodiment is shown. The parameters H and V may be adjusted in any one of the optical engines 10A and 10B. Since the adjustment of the parameter $\theta V$ is allocated to the first optical engine 10A, the spherical seat is not necessary, and a cylindrical seat can be used (will be described later).

In the adjustment, the optical engine 10A is rotationally moved about the center of the cross prism 2A in the $\theta V$ direction, and the optical engine 10B is rotationally moved about the center of the cross prism 2B in the $\theta H$ and $\theta Z$ directions. However, even though the cylindrical seat is used, the optical engines 10A and 10B are actually difficult to be designed to be accurately moved about the centers of the cross prisms. In order to achieve this, the size of the projection-type video display device 10 must be increased in size in the V-axis direction. For this reason, the rotating centers are often set to positions slightly displaced from the centers of the cross prisms.

Thus, in consideration of occurrence of the cross action, it is important to allocate the adjustments of the parameters to both the optical engines to make it easy to perform the adjustments. In FIG. 4, in consideration of occurrence of cross action, the parameters are allocated such that the parameters $\theta V$ and Z are adjusted in one optical engine and the parameters $\theta H$ and $\theta Z$ are adjusted in the other optical engine. The allocation of the parameters is only an example. A case using different allocation selected from different perspectives such as miniaturization of the device is included in the spirit and scope of the present invention.

In FIG. 4, in the first optical engine 10A, the parameter $\theta V$ is adjusted by a cylindrical seat included in the first adjusting base 21 on which the first optical engine 10A is mounted. A change of the parameter $\theta V$ generates a cross action to the parameter Z. For this reason, the second adjusting base 22 on which the first adjusting base 21 is mounted moves the first optical engine 10A and the first adjusting base 21 in the Z-axis direction to cancel the cross action. The second optical engine 10B adjusts the parameter $\theta Z$ by the cylindrical seat included in the third adjusting base 23 on which the second optical engine 10B is mounted. A change of the parameter $\theta Z$ generates a cross action to the H-axis direction. For this reason, the fourth adjusting base 24 on which the third adjusting base 23 is mounted rotates the second optical engine 10B and the third adjusting base 23 in the $\theta H$ direction to cancel the cross action.

The cylindrical seat need not be used for rotation in the $\theta H$ direction, the second optical engine 10B may be rotationally moved about the V axis passing through the center of the cross prism 2B.

As described above, in consideration of cross action to occur in the embodiment in FIG. 4, the parameters are allocated to complete the adjustment in each of the optical engines. In particular, the parameters $\theta V$ and $\theta Z$ are allocated to the different optical engines, respectively, to make a spherical seat unnecessary. For this reason, the adjusting mechanism is simplified, and the adjustment can be advantageously easily and accurately performed.

A configuration of a base portion to perform a method of adjusting the parameters shown in FIG. 4 will be described below with reference to the accompanying drawings.

Figure 5:
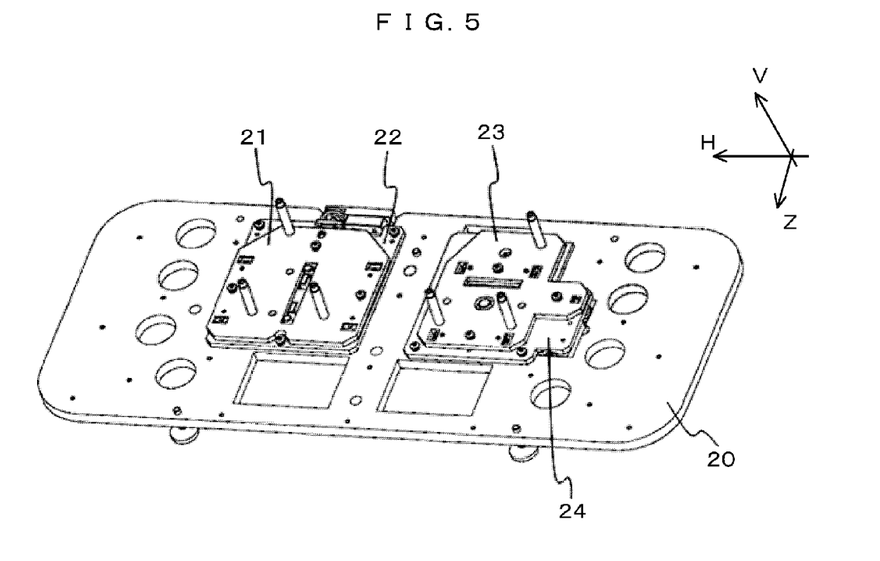
FIG. 5 is an outside view of a base portion of the projection-type video display device.

FIG. 5 is an outside view of the base portion of the projection-type video display device 10, and is a view drawn from the same side as that in FIG. 2.

As described above, the base portion includes the first adjusting base 21 on which the optical engine 10A is placed, the second adjusting base 22 on which the first adjusting base 21 is placed, the third adjusting base 23 on which the optical engine 10B is mounted, the fourth adjusting base 24 on which the third adjusting base 23 is mounted, and the main base 20 the second adjusting base 22 and the fourth adjusting base 24 are mounted. Although not indicated by reference symbols in the drawing, each of the first adjusting base 21 and the third adjusting base 23 has three posts each of which is used to attach the optical engine 10A or the optical engine 10B thereto.

FIG. 6A, FIG. 6B, FIG. 7A, and FIG. 7B are first to fourth plan views of a base portion of the projection-type video display device 10, and show mechanisms to adjust the parameters θV, Z, θZ, and θH in the order named. Each of the drawings has a sectional view cut along a broken line in the corresponding drawing.

Figure 6A:
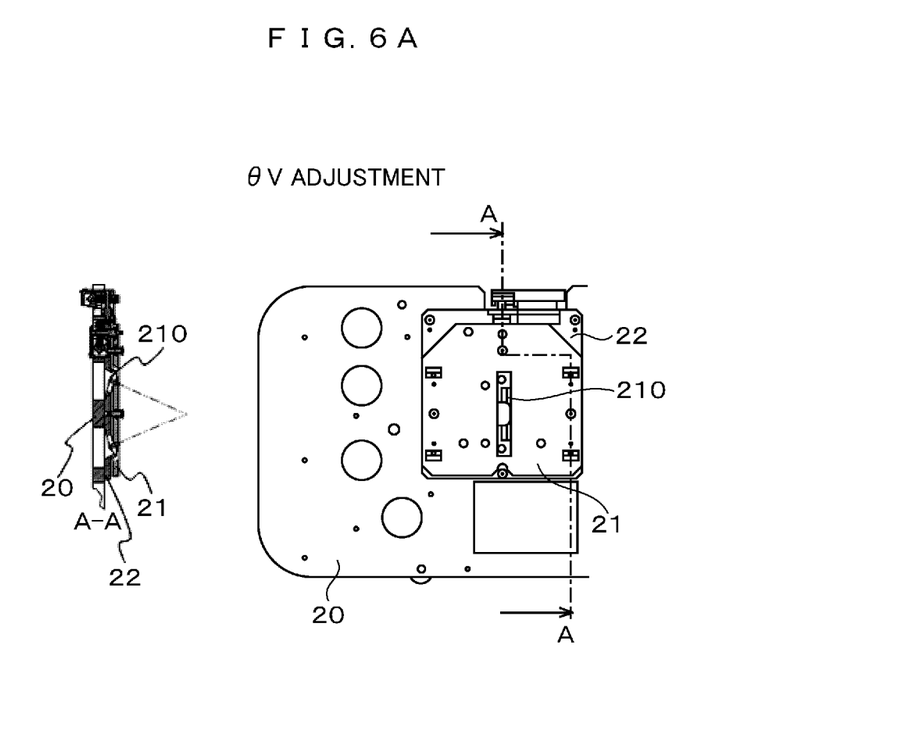
FIG. 6A is a first plan view of the base portion of the projection-type video display device.
Figure 6B:
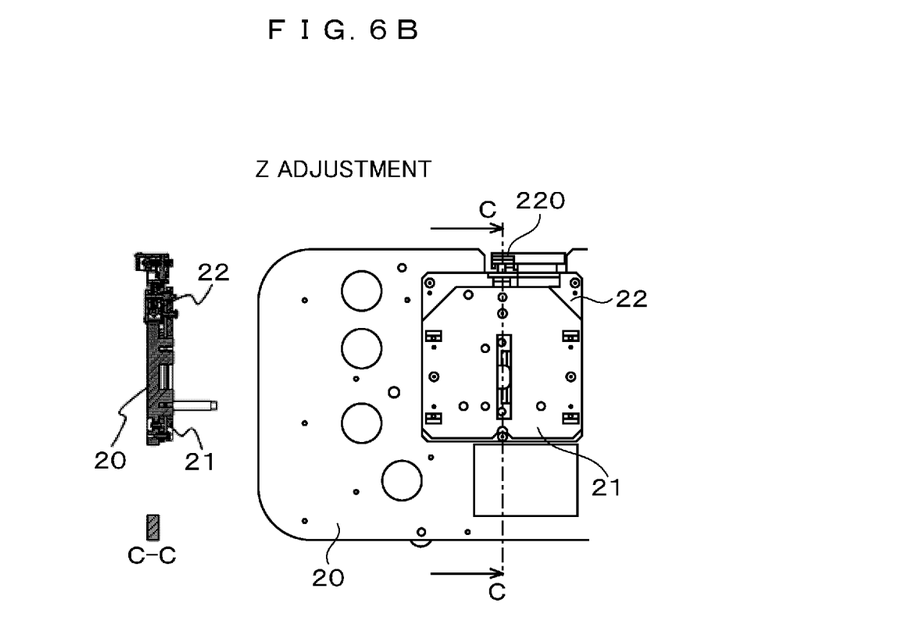
FIG. 6B is a second plan view of the base portion of the projection-type video display device.

Although both FIG. 6A and FIG. 6B are based on the same drawing related to the first adjusting base 21 and the second adjusting base 22, FIGS. 6A and 6B are shown as different drawings to make the two adjusting mechanisms clear. Similarly, both FIG. 7A and FIG. 7B are based on the same drawing related to the third adjusting base 23 and the fourth adjusting base 24, FIGS. 7A and 7B are shown as different drawings to make the two adjusting mechanisms clear.

In FIG. 6A, the first adjusting base 21 has a cylindrical seat 210. The cylindrical base 210 is a rotating seat to adjust the parameter θV of the optical engine 10A. Each broken line in the sectional view in FIG. 6A denotes a radius of the plane of the cylindrical seat 210, and the center of the cross prism 2A is located near a crossing point between the broken lines which is a rotating center.

In FIG. 6B, the second adjusting base 22 has a moving mechanism 220. The moving mechanism 220 has, for example, an adjusting screw, and moves the first adjusting base 21 to adjust the parameter Z of the optical engine 10A. With respect to the parameter Z, mechanical adjustment need not always be performed, and a method of changing a zoom ratio of the projection lens 3 to adjust the parameter Z may also be used.

Figure 7A:
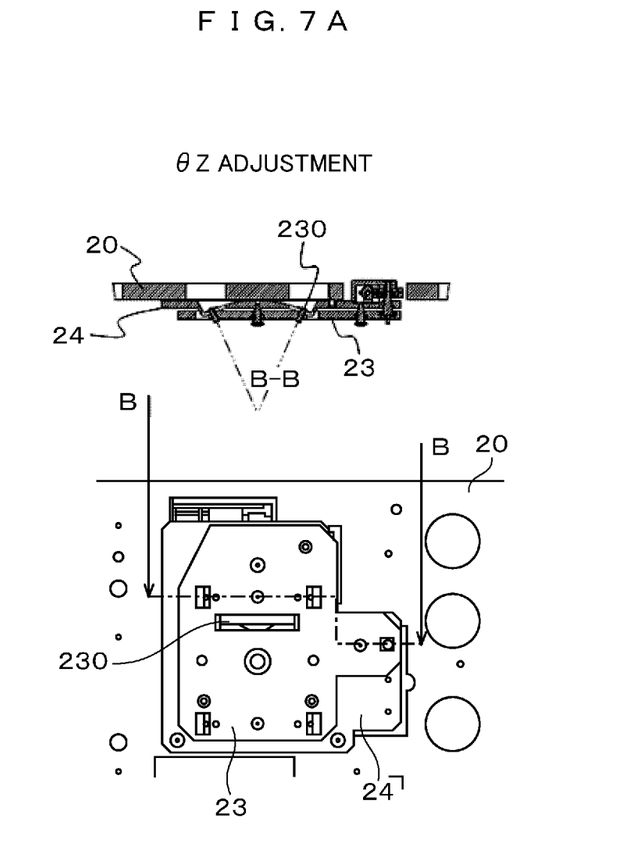
FIG. 7A is a third plan view of the base portion of the projection-type video display device.
Figure 7B:
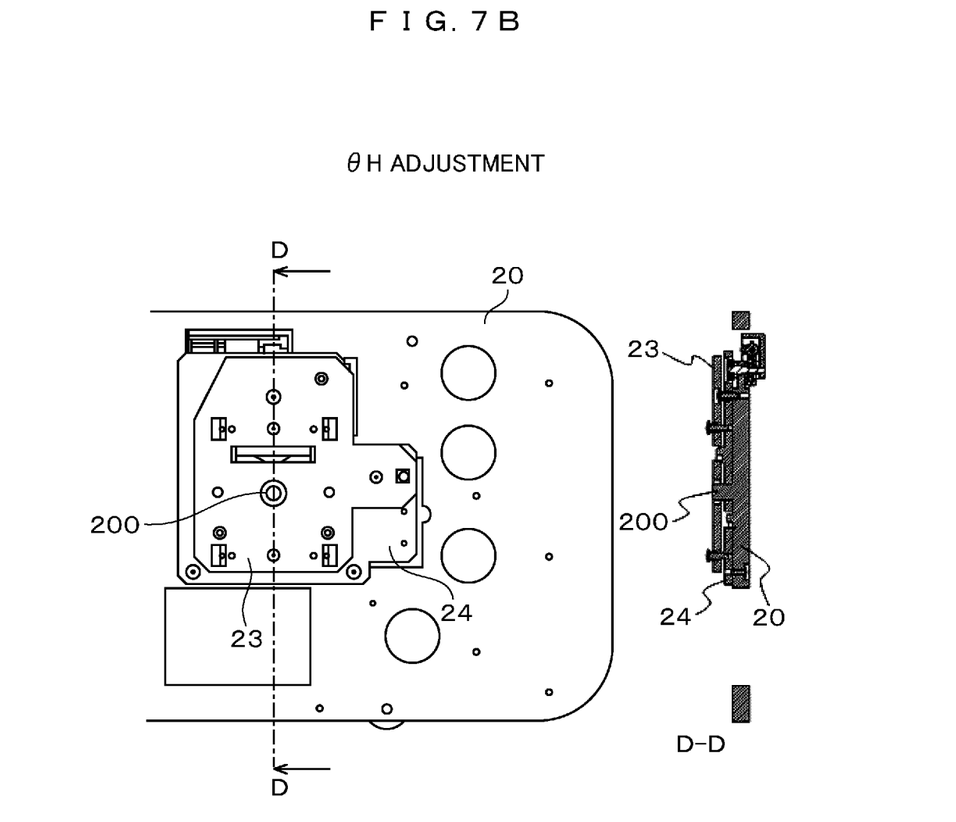
FIG. 7B is a fourth plan view of the base portion of the projection-type video display device.

In FIG. 7A, the third adjusting base 23 has a cylindrical seat 230. The cylindrical base 230 is a rotating seat to adjust the parameter θZ of the optical engine 10B. Each broken line in the sectional view in FIG. 7A denotes a radius of the plane of the cylindrical seat 230, and the center of the cross prism 2B is located near a crossing point between the broken lines which is a rotating center.

In FIG. 7B, the fourth adjusting base 24 rotates about a cylindrical projection included in the main base 20, and moves the third adjusting base 23 to adjust the parameter θH of the optical engine 10B. The center of the cross prism 2B is on an extension of a center line of the projection 200.

As shown as an example in FIG. 6A, FIG. 6B, FIG. 7A, and FIG. 7B, a user can easily adjust the parameters θV, Z, θZ, and θH.

Adjustment of the other parameters H and V will be described below. As a method, a method of moving the positions of the optical engine 10A or 10B in the H-axis or V-axis direction is given. As another method, a method of moving the position of the projection lens 3 with respect to the cross prism 2 in the H-axis or V-axis direction is given.

Figure 8:
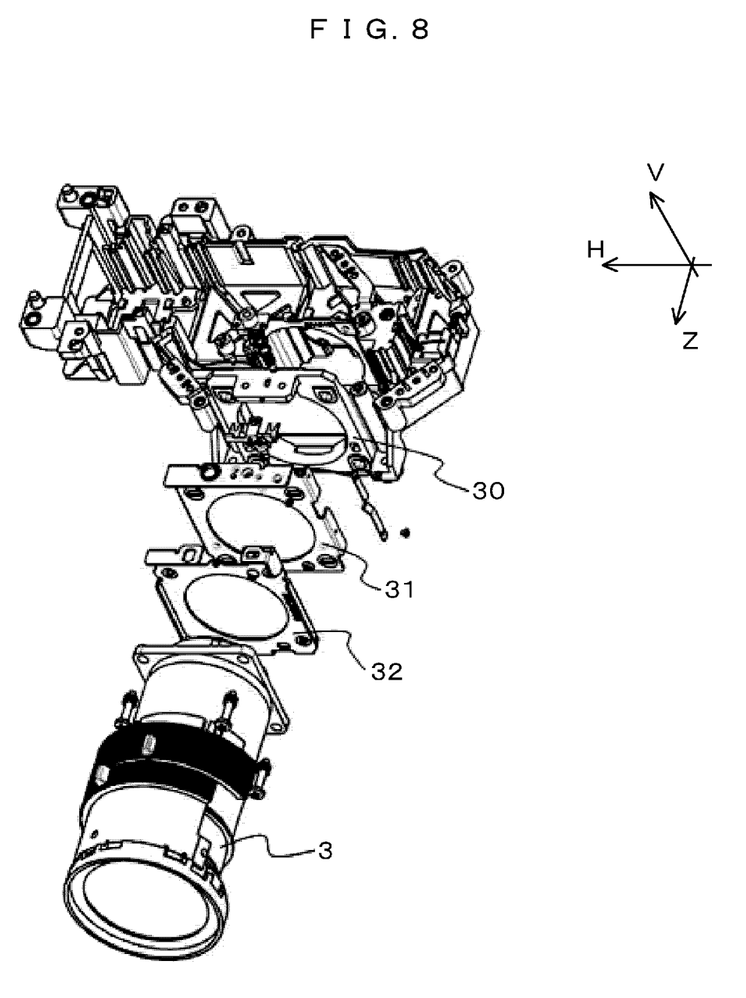
FIG. 8 is an exploded view of a portion near a projection lens in the projection-type video display device.

FIG. 8 is an exploded view of a portion near the projection lens 3 of the projection-type video display device. A projection lens attaching portion 30 on the optical engine side, a first plate 31 is attached. A second plate 32 is attached to the projection lens 3. A second plate 32 is attached to the first plate 31 with an attaching member to fix the projection lens 3 to the optical engine. At this time, for example, a margin is given to the size of a hole of the first plate 31 through which the attaching member passes to make it possible to relatively move the first plate 31 and the second plate 32 in the H-axis or V-axis direction.

In this manner, the position of the projection lens 3 with respect to the cross prism 2 can be moved in the H-axis or V-axis direction to make it possible to adjust the parameters H and V.

According to the embodiment, the projection-type video display device which optically projects an image based on a video signal on an external display unit includes two optical engines each optically projecting the image to the outside and an adjusting mechanism which adjusts six parameters expressed by horizontal (H-axis direction) positions H and vertical (V-axis direction) positions V of the images displayed by the two optical engines, depth-direction (Z-axis direction) positions Z between the two optical engines and the display unit, relative angles θH of the X-axis direction with respect to the V axes of the two optical engines, relative angles θV of the V-axis direction with respect to the H axes of the two optical engines, and relative angles θZ of the X-axis direction with respect to the Z axes of the two optical engines. One of the two optical engines has an adjusting mechanism which adjusts at least one and 5 or less parameters of the six parameters, and the other optical engine has an adjusting mechanism which adjusts the other parameters of the six parameters.

In the projection-type video display device, each of the two optical engines is an optical engine of a liquid crystal display device including a liquid crystal panel unit having a first liquid crystal panel which generates an optical image based on a red primary color signal of the video signal, a second liquid crystal panel which generates an optical image based on a green primary color signal of the video signal, and a third liquid crystal panel which generates an optical image based on a blue primary color signal of the video signal, a cross prism which synthesizes the optical images generated by the first to third liquid crystal panels with each other, and a projection lens which projects the optical image synthesized by the cross prism to the outside. The origins of the X axis, the Y axis, and the X axis are located at the optical center of the cross prism.

Furthermore, in the projection-type video display device, one optical engine of the two optical engines has an adjusting mechanism which adjusts at least the parameters θV and Z of the six parameters, and the other optical engine has an adjusting mechanism which adjusts at least the parameters θZ and θH of the six parameters.

In this manner, the projection-type video display device including two optical engines can obtain high performance and high functionality, the six parameters can be easily and accurately adjusted, and an application range of the projection-type video display device can be advantageously extended. The embodiment described above is an example, and does not limit the present invention. Although other embodiments based on the spirit and scope of the present invention are conceived, the embodiments are included in the category of the present invention.

REFERENCE SIGNS LIST

1 . . . liquid crystal panel unit,
2 . . . cross prism,
3 . . . projection lens,
10 . . . projection-type video display device,
10A, 10B . . . optical engine,
20 . . . main base,
21, 22, 23, 24 . . . adjusting base,
30 . . . projection lens attaching portion,
31 . . . first plate,
32 . . . second plate,
101 . . . light source unit,
102 . . . concave lens,
103 . . . multi-array lens,
104 . . . linear polarizing unit,
105 . . . superposing lens,
106 . . . reflecting mirror,
107 . . . dichroic mirror,
108 . . . collimator lens,
109, 110 . . . relay lens.

The invention claimed is:

1. A projection-type video display device which optically projects an image based on a video signal on an outside display unit, comprising:
   two optical engines which optically project the image to the outside, and
   an adjusting mechanism which adjusts six parameters expressed by horizontal (H-axis direction) positions H and vertical (V-axis direction) positions V of the images displayed by the two optical engines, depth-direction (Z-axis direction) positions Z between the two optical engines and the display unit, relative angles θH of the H-axis direction with respect to the V axes of the two optical engines, relative angles θV of the V-axis direction with respect to the H axes of the two optical engines, and relative angles θZ of the V-axis direction with respect to the Z axes of the two optical engines,
   wherein one of the two optical engines has an adjusting mechanism which adjusts at least one and 5 or less parameters of the six parameters, and the other optical engine has an adjusting mechanism which adjusts the other parameters of the six parameters,
   wherein each of the two optical engines is an optical engine of a liquid crystal display device including:
   a liquid crystal panel unit having a first liquid crystal panel which generates an optical image based on a red primary color signal of the video signal, a second liquid crystal panel which generates an optical image based on a green primary color signal of the video signal, and a third liquid crystal display panel which generates an optical image based on a blue primary color signal of the video signal, and
   a cross prism which synthesizes the optical images generated by the first to third liquid crystal panels,
   wherein origins of the H axis, the V axis, and the Z axis are located at an optical center of the cross prism,
   wherein one optical engine of the two optical engines has an adjusting mechanism which adjusts at least the parameter θV of the six parameters, and the other optical engine adjusts at least the parameter θZ of the six parameters, and
   wherein the adjusting mechanisms include:
   a cylindrical seat having the optical center of the cross prism to adjust the parameter θV as a rotating center,
   a cylindrical seat having the optical center of the cross prism to adjust the parameter θZ as a rotating center, and
   a rotating mechanism having the optical center of the cross prism to adjust the parameter θH as a rotating center.

2. The projection-type video display device according to claim 1, wherein
   each of the two optical engines is an optical engine of a liquid crystal display device including:
   a liquid crystal panel unit having a first liquid crystal panel which generates an optical image based on a red primary color signal of the video signal, a second liquid crystal panel which generates an optical image based on a green primary color signal of the video signal, and a third liquid crystal display panel which generates an optical image based on a blue primary color signal of the video signal,
   a cross prism which synthesizes the optical images generated by the first to third liquid crystal panels, and
   a projection lens which projects an optical image synthesized by the cross prism to the outside,
   wherein origins of the H axis, the V axis, and the Z axis are located at an optical center of the cross prism.

3. The projection-type video display device according to claim 1, wherein
   the adjusting mechanisms move the H-axis direction position or the V-axis direction position of the projection lens with respect to the cross prism to adjust the parameter H or V.

* * * * *